United States Patent [19]
Bailey

[11] Patent Number: 4,502,758
[45] Date of Patent: Mar. 5, 1985

[54] ABSORPTION PATH CONTROLLED FILTER

[75] Inventor: Theodore B. Bailey, Ridgecrest, Calif.

[73] Assignee: The United States of America as represented by the Secretary of the Navy, Washington, D.C.

[21] Appl. No.: 391,894

[22] Filed: Jun. 24, 1982

[51] Int. Cl.³ .................. G02B 5/24; G05D 25/00
[52] U.S. Cl. ................................ 350/267; 350/312
[58] Field of Search .............. 350/267, 312, 449, 450

[56] References Cited

U.S. PATENT DOCUMENTS

| | | | |
|---|---|---|---|
| 612,937 | 11/1898 | Uebelacker. | |
| 1,234,333 | 7/1917 | Heathcote. | |
| 2,537,011 | 1/1951 | Aparicio | 88/60 |
| 3,560,077 | 2/1971 | Sooy et al. | 350/160 |
| 3,572,907 | 3/1971 | Cindrich | 350/312 |
| 3,990,786 | 11/1976 | Jorna et al. | 350/205 |
| 4,065,207 | 12/1977 | Zavitsanos et al. | 350/312 |

OTHER PUBLICATIONS

Amelio, *Charge-Coupled Devices*, "Scientific American," vol. 230, No. 2, Feb. 1974, pp. 22 to 31.
Marshall Graham, A Piezoelectric Fine-Focusing Optical Mount, *Rev. Sci. Instrum.*, vol. 45, No. 8, Aug. 1974, pp. 1026–1027.

Primary Examiner—Bruce Y. Arnold
Assistant Examiner—William Propp
Attorney, Agent, or Firm—Robert F. Beers; W. Thom Skeer; Kenneth G. Pritchard

[57] ABSTRACT

A controlled absorption path filter for charge couple device seekers is made using a variable depth fluid. The use of a liquid as an absorber permits the entire aperture area to darken without loss of aperture. Thus the device provides a uniform extinction feature which preserves the system modulation transfer function. The device can be tied to a closed loop system with automatic gain control for feedback. Depending on the nature of absorber in the liquid, the device can also serve as a spectral filter. The device is applicable for visible light to near infrared light.

8 Claims, 5 Drawing Figures

ABSORPTION PATH CONTROLLED FILTER

BACKGROUND OF THE INVENTION

1. Field of the Invention

The present invention is for large aperture light control devices. In particular, it applies to charge couple device, CCD, cameras. Specifically, the present invention provides high sensitivity control for the imager section of a CCD seeker in a weapon system.

2. Description of the Prior Art

Conventional vidicon camera systems are inappropriate for small lightweight applications such as missile system seekers. In general, they are too big and clumsy for use in such systems. A persistent advantage of vidicon cameras over CCD camera systems has been the inherent sensitivity control of vidicon cameras.

Use of charge couple device cameras has been limited. Sensitivity control for CCD cameras has been limited to using a refractive lens with an automatic iris. The automatic iris causes a loss of aperture when the amount of light entering has to be reduced. As the aperture becomes smaller, diffraction effects become increasingly important and eventually limit resolution of a device with an automatic iris. The limit depends upon the wavelength of operation. The automatic iris imposes an inherent limit of how far down light control can be reduced before other factors prevent operability. Thus, while a CCD imager had relatively small size and weight due to its being a voltage control device it has a significantly limited dynamic range of sensitivity.

Previous attempts to avoid this problem have included the "Electrically Controlled Variable Iris." This device seeks to maintain as large an aperture as possible. For the electronically controlled variable iris, a large aperture iris is controlled by a piezoelectric stack cylinder control. A flexible window is used to encase an optical fluid. The amount of bow in the window controls the depth of the fluid as a function of radius. An example of such a prior art device is shown in FIG. 1.

In FIG. 1, incident light 10 passes through a support window 12. Light 10 then passes through a correction liquid 14 which is transparent or can be a liquid chosen to act as a spectral filter. Light 10 then passes through a flexible window 16 and an optical liquid 18 where some of the light is absorbed. Flexible window 16 is mounted against a central support post 20. The light exits through an optical window 22. An elastic bladder 24 separates correction liquid 14 from optical liquid 18. Passage 30 permits the fluid to flow in accordance with the change of shape of flexible window 16. Piezoelectric stack cylinder 26 elongates or contracts in accordance with voltage applied through control wires 28. Path length at the center of the aperture is a minimum when piezoelectric stacks cylinders 26 are elongated. The maximum transmittance is always near the center of flexible window 16 as shown. The transmittance decreases radially as controlled by the amount of elongation of piezoelectric stack cylinder 26 and the flexing characteristics of flexible window 16.

SUMMARY OF THE INVENTION

Large aperture attenuation is provided by maintaining the collecting area of the aperture through a pair of optical windows which have a uniform separation distance between them. The separation distance is variable and filled with an optical absorption liquid. This provides a uniform extinction feature. The entire iris area darkens without loss of diffraction in that aperture. By the selected use of dye in the optical absorption liquid, such as ethanol glycol, the device is also used as a spectral filter at the same time that it is used as a light attenuator.

The separation distance can either be controlled mechanically or electrically. This permits a high level of transmittance even without an anti-reflection coating. Transmittance of 99% or better can be achieved using anti-reflection coatings. By using a closed loop system, an automatic gain control feedback can be incorporated to adjust the light attenuation to a uniform level. As the light level decreases, the transmittance curve broadens to an orb where no absorption occurs. This permits uniform extinction over a large dynamic range and is applicable for light in the visible to near infrared spectrum.

It is an object of the present invention to provide a large dynamic light range exposure control and good on state transmittance for CCD seekers. It is a further object of the present invention to provide an exposure control which can also serve as a spectral filter.

DESCRIPTION OF THE PREFERRED EMBODIMENT

Figure 1:
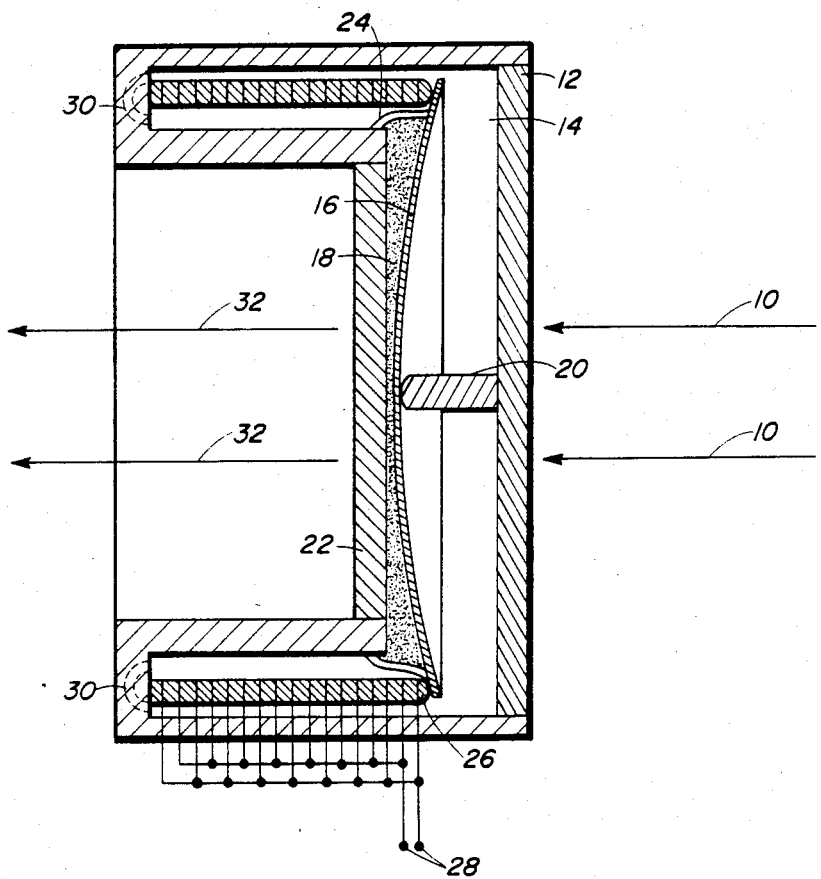
FIG. 1 is a cross-sectional view of a prior art device.
Figure 2:
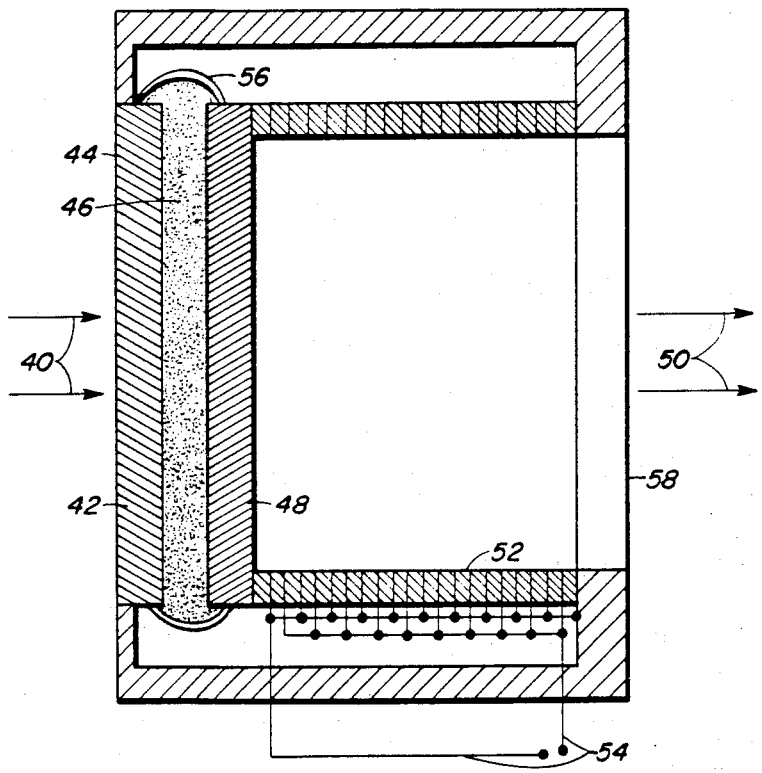
FIG. 2 is a cross-sectional view of an electrically controlled variable light valve.

In FIG. 2, incident light 40 passes through a stationary optical window 42 which can have an anti-reflection coating 44 on its surface. Light 40 passes through optical window 42 and through an optical liquid 46 where some of incident light 40 is absorbed. The remainder of light 40 then passes through a movable optical window 48 and exits as transmitted light 50. The amount of incident light 40 transmitted as light 50 is described by the relation $$I = I_0 e^{-kx}$$

where
I is transmitted light intensity 50,
$I_0$ is incident light intensity 40,
k is the absorption coefficient of the medium, and
x is the path length through the medium.

Windows 42 and 48 are chosen to be transparent in the optical wavelengths of interest. For visible light, glass is an example of a suitable material. The attenuation is considered to be solely controlled by the absorption coefficient of optical liquid 46 and path length x. Path length x is the spacing between the inner surface of windows 42 and 48. The position of movable optical window 48 controls the optical path length x. The path length goes to zero when optical windows 42 and 48 are in contact with one another. The position of movable optical window 48 and thus optical path length x is controlled by a piezoelectric stack 52. Piezoelectric stack 52 elongates along the optical axis of the device when voltage is supplied to the control terminals 54. Hence, optical path length x and the intensity of transmitted light 50 are controlled by the voltage supplied to control terminals 54. An elastic bladder 56 is used to contain optical liquid 46 between windows 42 and 48. Bladder 56 serves as a reservoir and pressure control for optical liquid 46. The device is held together by a holding fixture 58.

Best Mode

Figure 3:
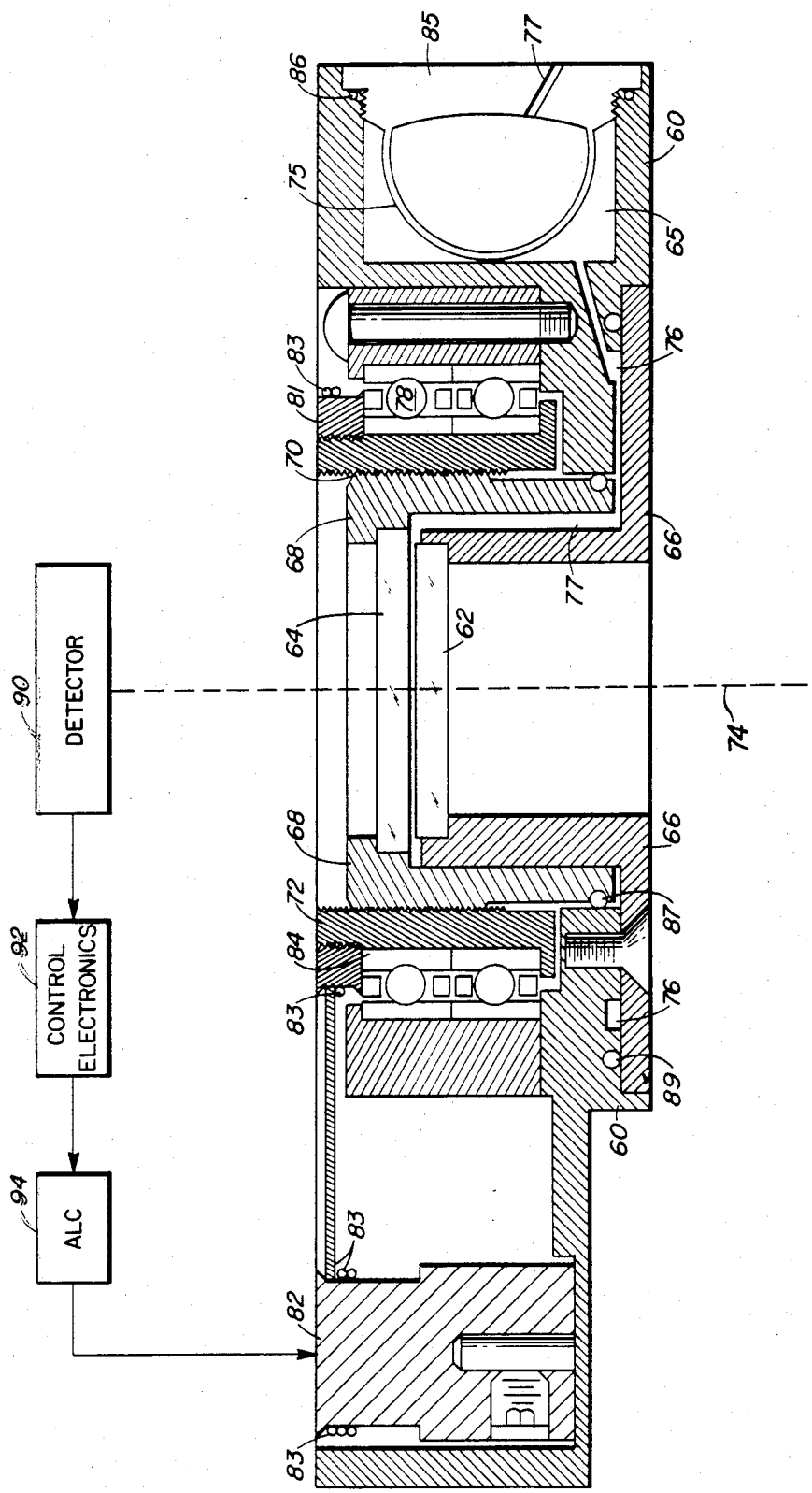
FIG. 3 is a cross-sectional view of an absorption path controlled filter that is mechanically adjusted.

FIG. 3 represents the best mode of the present invention. FIG. 3 does use a bladder 75 to contain the excess fluid not between optical windows. As a result of mechanical adjustments, the device is less pressure sensitive and less prone to bladder 75 leakage or fatigue. A housing 60 includes two optical windows 62 and 64. Window 62 is sealed to a stationary mount 66. Window 64 is sealed in mount 68 which is a movable mount. Mount 68 has threads 70 which are matched to threads in a drive housing 72. Maximum light passes through windows 62 and 64 when they are side by side. As shown in FIG. 3, the absorption path length, x, is near maximum. Window movement of twelve one thousandths of an inch is enough the change the transmittance from full-on to full-off. Activation of drive housing 72 translates window 64 along optical axis 74. Rotation of drive housing 68 is prevented by a pin, not shown. The space between windows 62 and 64 is filled by a liquid from the compensator reservoir 65 via a channel 76. Channel 76 reaches the space between optical windows 62 and 64 by liquid paths 77. Channel 76 is a ring between housing 60 and stationary mount 66. Stationary mount 66 and mount 68 form a fluid tight seal except for a few channel paths 77. Three evenly spaced channel paths 77 around the circumference of stationary mount 66 have been found to be adequate. O-rings 87 and 89 provide fluid tight seals. The liquid is an ethylene glycol based solution with a dye as an absorber. Numerous other liquids can be used. Drive housing 72 is held in alignment and prevented from movement laterally by bearings 78. Bearings 78 permit the rotary motion necessary to translate movable mount 68 by screwing or unscrewing it away from stationary mount 66 via drive ring 81. Drive ring 81 is turned by a motor, not shown, via pully 82 and cable 83. The rotating elements of drive ring 81, interior bearing walls 84 and drive housing 72 all rotate as a unit. A compensator reservoir rubber bladder 75 separates compensatory reservoir 65 from ambient air pressure by air hole 77. Air hole 77 is part of reservoir cap 85 which screws into housing 60 and seals using O-ring 86. Windows 64 and 62 can also be filters for selected wavelengths or a range of wavelengths as desired. Anti-reflection coatings can be applied to the surfaces of windows 64 or 62 as appropriate to improve transmittance of the device.

Light transmitted through all of the above finally reaches a detector 90, ideally a CCD imager. Output from detector 90 is fed to camera control electronics 92 which feed an automatic light control, ALC, circuit 94. This signal controls drive motor and pully assembly 82 that actuates the APC filter. This closed loop system maintains the light level to the CCD imager at a constant preset level.

Figure 4:
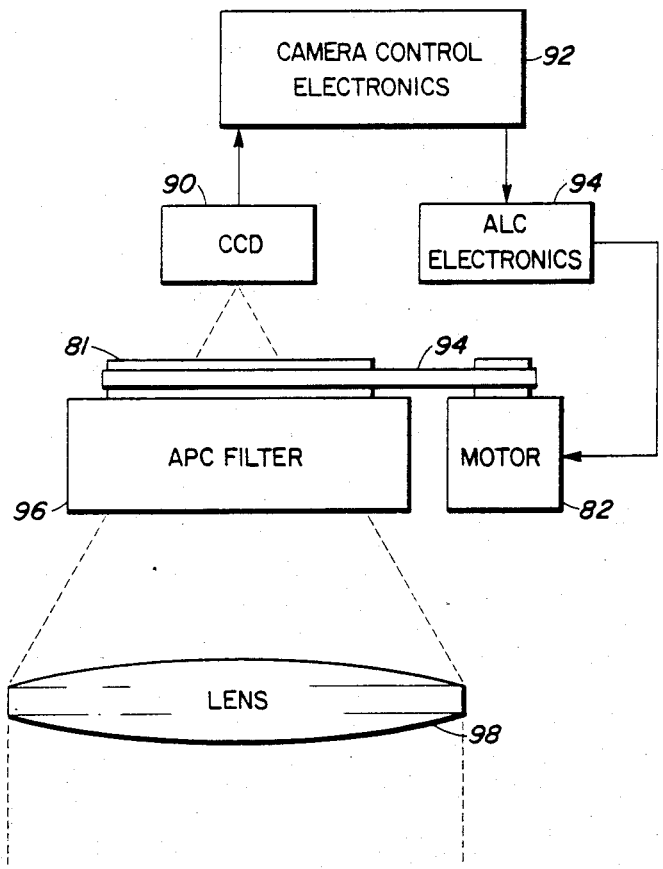
FIG. 4 is a block diagram of the present invention.
Figure 5:
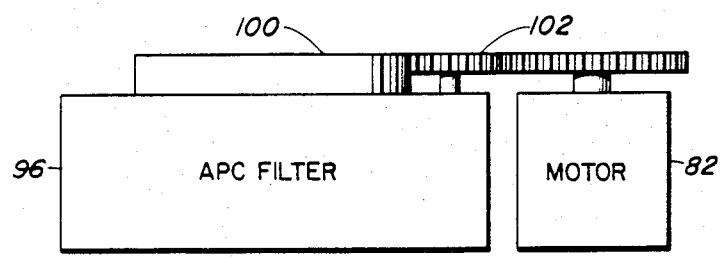
FIG. 5 is an alternate block diagram of part of the present invention.

FIG. 4 is a block diagram of the present invention. Incoming light is focused by a lens 98 through automatic path control, APC, filter 96 to a detector 90. Numbers are the same for components previously shown. APC filter 96 includes components 60 through 78 previously described. Motor and pully assembly 82 is connected to drive ring 81 by a cable drive 94. FIG. 5 shows an alternate connection using a gear 100 and a drive gear 102.

It is obvious to those skilled in the art that numerous modifications to the above invention can be made.

What is claimed is:

1. An automatic light controlled absorption path filter for incident light comprising:
   a first housing means with a window placed so that said incident light enters said window;
   a second housing means with a window next to said window of said first housing means, said first and second housing means mounted together to form an adjustable volume between said windows;
   a fluid reserve filled with a fluid that feeds said volume between said first and second housing means for keeping said volume full of a preselected fluid;
   a drive housing connected to move said second housing means, to thereby vary the spacing and volume of fluid contained between said windows of said first and second housing means;
   a motor connected to said drive housing;
   a light detector placed to receive said incident light after it has passed through said windows of said first and second housing means; and
   automatic light control means connected between said light detector and said motor, such that said motor adjusts said housing in a predetermined manner in response to the amount of incident light received by said light detector.

2. An automatic light controlled absorption path filter as described in claim 1 where said light detector comprises a charge coupled device, CCD, camera.

3. An automatic light controlled absorption path filter as described in claim 2 where said automatic light control means comprises camera control electronics connected to said CCD camera and an automatic light control connected between said motor and said camera control electronics.

4. An automatic light controlled absorption path filter as described in claim 3 where said fluid comprises an ethylene glycol based solution with a dye as a spectral filter.

5. An automatic light controlled absorption path filter as described in claim 4 further comprising an anti-reflection coating on the external side of said window in said first housing means.

6. An automatic light controlled absorption path filter as described in claim 3 further comprising an anti-reflection coating on the external side of said window in said first housing means.

7. An automatic light controlled absorption path filter as described in claim 1 where said fluid comprises an ethylene glycol based solution with a dye as a spectral filter.

8. An automatic light controlled absorption path filter as described in claim 1 further comprising an anti-reflection coating on the external side of said window in said first housing means.

* * * * *